（12）United States Patent
Otsuki

(10) Patent No.: US 8,462,398 B2
(45) Date of Patent: Jun. 11, 2013

(54) IMAGE SCANNING DEVICE

(75) Inventor: Osamu Otsuki, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 328 days.

(21) Appl. No.: 12/980,459

(22) Filed: Dec. 29, 2010

(65) Prior Publication Data

US 2011/0176182 A1 Jul. 21, 2011

(30) Foreign Application Priority Data

Jan. 18, 2010 (JP) .................. 2010-007836
Sep. 29, 2010 (JP) .................. 2010-218751

(51) Int. Cl.
*H04N 1/04* (2006.01)
(52) U.S. Cl.
USPC ............ 358/474; 358/496; 358/497; 358/498
(58) Field of Classification Search
USPC .................. 358/474, 496, 497, 498
See application file for complete search history.

(56) References Cited

U.S. PATENT DOCUMENTS

| | | | |
|---|---|---|---|
| 3,867,569 A | 2/1975 | Watson | |
| 4,870,502 A * | 9/1989 | Dreinhoff et al. | ............. 358/474 |
| 5,734,483 A | 3/1998 | Itoh | |
| 8,310,735 B2 * | 11/2012 | Mui et al. | ....................... 358/474 |
| 2004/0195326 A1 * | 10/2004 | Tregoning et al. | ............ 235/454 |

FOREIGN PATENT DOCUMENTS

| | | |
|---|---|---|
| EP | 0 281 501 A1 | 9/1988 |
| EP | 1 227 655 A2 | 7/2002 |
| JP | 1-133466 A | 5/1989 |
| JP | 10-210233 A | 8/1998 |
| JP | 10-243181 A | 9/1998 |
| JP | 2002-51192 A | 2/2002 |
| JP | 2006-197419 A | 7/2006 |

OTHER PUBLICATIONS

Official Communication issued in corresponding European Patent Application No. 10197300.6, mailed on Feb. 24, 2011.

* cited by examiner

*Primary Examiner* — Houshang Safaipour
(74) *Attorney, Agent, or Firm* — Keating & Bennett, LLP

(57) ABSTRACT

An image scanning device includes a housing, a scanning carriage, and a first guide groove and a second guide groove. The housing includes a bottom chassis and a side wall member, and defines a document tray. A scanning carriage is movably arranged in the housing. The first guide groove and the second guide groove are arranged at the side wall members of the housing, and guide the scanning carriage in a scanning direction.

6 Claims, 11 Drawing Sheets

IMAGE SCANNING DEVICE

This application claims priority under 35 U.S.C. 119 to Japanese Patent Application Nos. 2010-7836, filed on Jan. 18, 2010 and 2010-218751 filed on Sep. 29, 2010, which applications are hereby incorporated by reference in their entirety.

BACKGROUND OF THE INVENTION

1. Field of the Invention

The present invention relates to image scanning devices, and in particular, to an image scanning device including a scanning carriage.

2. Description of the Related Art

Some scanners, facsimiles, copy machines, and the like use a flat bed scanner (hereinafter referred to as "FBS") in which a scanning unit of a reduction optical system such as a Charge Coupled Device (CCD) is incorporated in a scanning table as an image scanning unit.

In JP-A-2006-197419, an image scanning device 1 includes a carriage 20. A guide shaft 22 extending along the scanning direction is arranged on one side of a scanning range of the carriage 20. The guide shaft 22 is inserted into a guide hole of a supporting unit 23 arranged at one side portion of the carriage 20 so that the carriage 20 is arranged to be freely slidable along the guide shaft 22. A side unit 24 on the side opposite to the supporting unit 23 of the carriage 20 is mounted on a horizontal frame 25 of a device main body arranged to extend in the scanning direction so as to become a free end. When moving the carriage 20, the carriage 20 can be moved by reciprocating a drive belt 26 in the scanning direction with a drive unit such as a motor attached on the supporting unit 23 side of the carriage 20.

When the guide shaft is used as a mechanism for supporting the carriage as in JP-A-2006-197419, the cost becomes expensive since high accuracy is demanded.

SUMMARY OF THE INVENTION

Preferred embodiments of the present invention guide a scanning carriage with a simple structure while maintaining sufficient accuracy in an image scanning device.

A plurality of preferred embodiments of the present invention will be described below, and can be arbitrarily combined as necessary or desired.

An image scanning device according to a preferred embodiment of the present invention includes a housing, a scanning carriage, and a side wall guide groove. The housing includes a bottom surface and a side wall, and defines a document table. The scanning carriage is movably arranged in the housing. The side wall guide groove is arranged at the side wall of the housing and includes a structure arranged to guide the scanning carriage in a scanning direction.

In this device, the scanning carriage is guided in the scanning direction by the side wall guide groove when moving through the housing. The scanning carriage is thus guided with a simple structure while maintaining sufficient accuracy.

The side wall guide groove may include a plurality of portions having different heights.

In this device, the scanning carriage preferably includes a structure in which a height is changed in accordance with the side wall guide groove. Thus, the scanning carriage can move to a higher position or can move to a lower position than the normal height, as necessary.

The image scanning device may further include an automatic document transportation device, and a slit glass, arranged in the housing, to enable a document sent from the automatic document transportation device to be scanned by the scanning carriage. In this case, the side wall guide groove may include a first portion and a second portion corresponding to the slit glass and being lower than the first portion.

In this device, the scanning carriage moves to the lower side that is lower than the normal position at the position corresponding to the slit glass since the side wall guide groove includes the second portion corresponding to the slit glass and being lower than the first portion. Therefore, the interference of the scanning carriage and the slit glass can be avoided even if the normal traveling position of the scanning carriage is made sufficiently high.

The image scanning device may further include a platen glass, an automatic document transportation device, a slit glass, and a supporting member. The automatic document transportation device is arranged above the platen glass. The slit glass is preferably aligned with the platen glass and enables a document sent from the automatic document transportation device to be scanned by the scanning carriage. The supporting member is arranged between the slit glass and the platen glass. The side wall guide groove includes a first portion corresponding to the slit glass, a second portion corresponding to the supporting member and being lower than the first portion, and a third portion corresponding to the platen glass and being higher than the second portion.

In this device, the scanning carriage can take in the document image while being proximate to the platen glass when the scanning carriage travels through the first portion of the side wall guide groove. Furthermore, the scanning carriage can take in the document image while being proximate to the slit glass when the scanning carriage is positioned at the third portion of the side wall guide groove. Moreover, the scanning carriage moves to the lower side than the image scanning position when passing through the second portion of the side wall guide groove. Therefore, the scanning carriage is less likely to collide against the supporting member even if the image scanning position of the scanning carriage is relatively high.

The side wall guide groove may preferably be integrally molded with the housing, for example. In this device, the number of components is reduced and the configuration is simplified.

The image scanning device may further include a bottom surface guide groove arranged at the bottom surface of the housing to guide the scanning carriage in the scanning direction. In this device, the supporting accuracy is further enhanced since the scanning carriage is guided by the bottom surface guide groove, and as a result, the scanning carriage can stably travel.

In the image scanning device according to various preferred embodiments of the present invention, the scanning carriage is guided with a simple structure while maintaining a sufficient accuracy.

The above and other elements, features, steps, characteristics and advantages of the present invention will become more apparent from the following detailed description of the preferred embodiments with reference to the attached drawings.

BRIEF DESCRIPTION OF THE DRAWINGS

DETAILED DESCRIPTION OF THE PREFERRED EMBODIMENTS (1) Copy/Facsimile Multifunction Peripheral A copy/facsimile multifunction peripheral 1 will be described with reference to FIGS. 1 and 2. FIG. 1 is a perspective view of an outer appearance of an upper portion of a copy/facsimile multifunction peripheral 1 including an image scanning device according to a preferred embodiment of the present invention.

Hereinafter, the left and right direction of the device (belt extending direction, and scanning direction of carriage) is referred to as an "X-direction", and the front and back direction of the device is referred to as a "Y-direction". The X-direction and the Y-direction are perpendicular or substantially perpendicular to each other.

Figure 1:
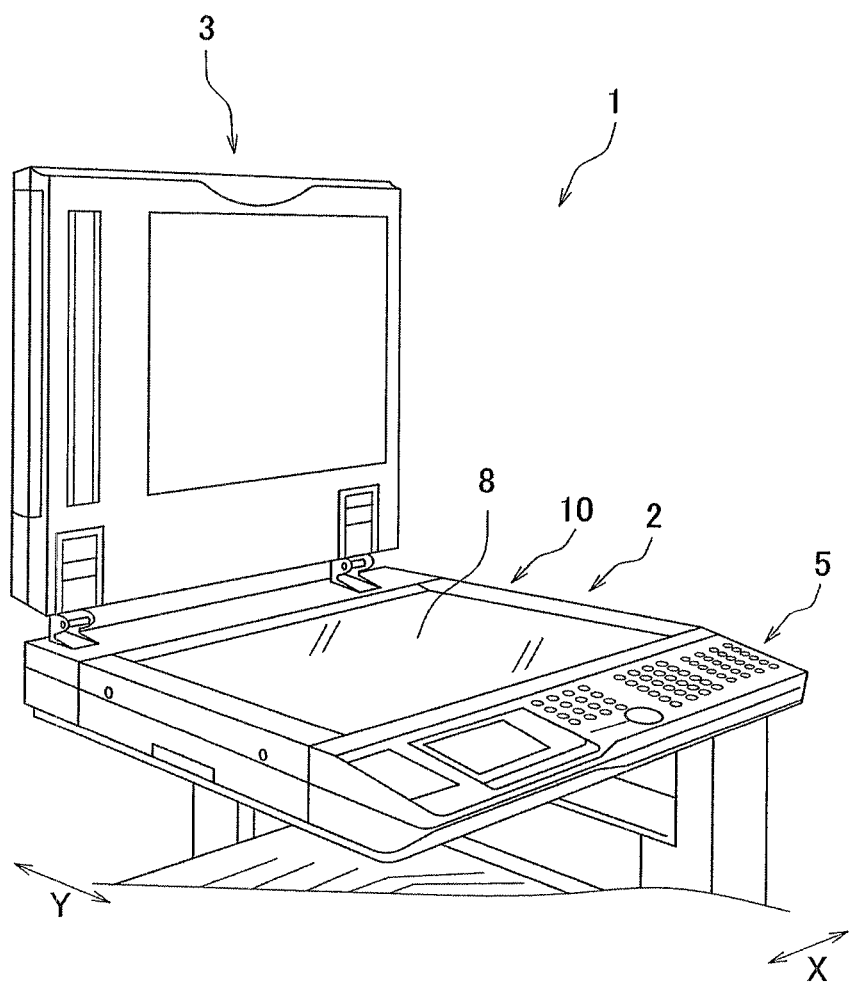
FIG. 1 is a perspective view of an outer appearance of an upper portion of a copy/facsimile multifunction peripheral including an image scanning device according to a first preferred embodiment of the present invention.
Figure 2:
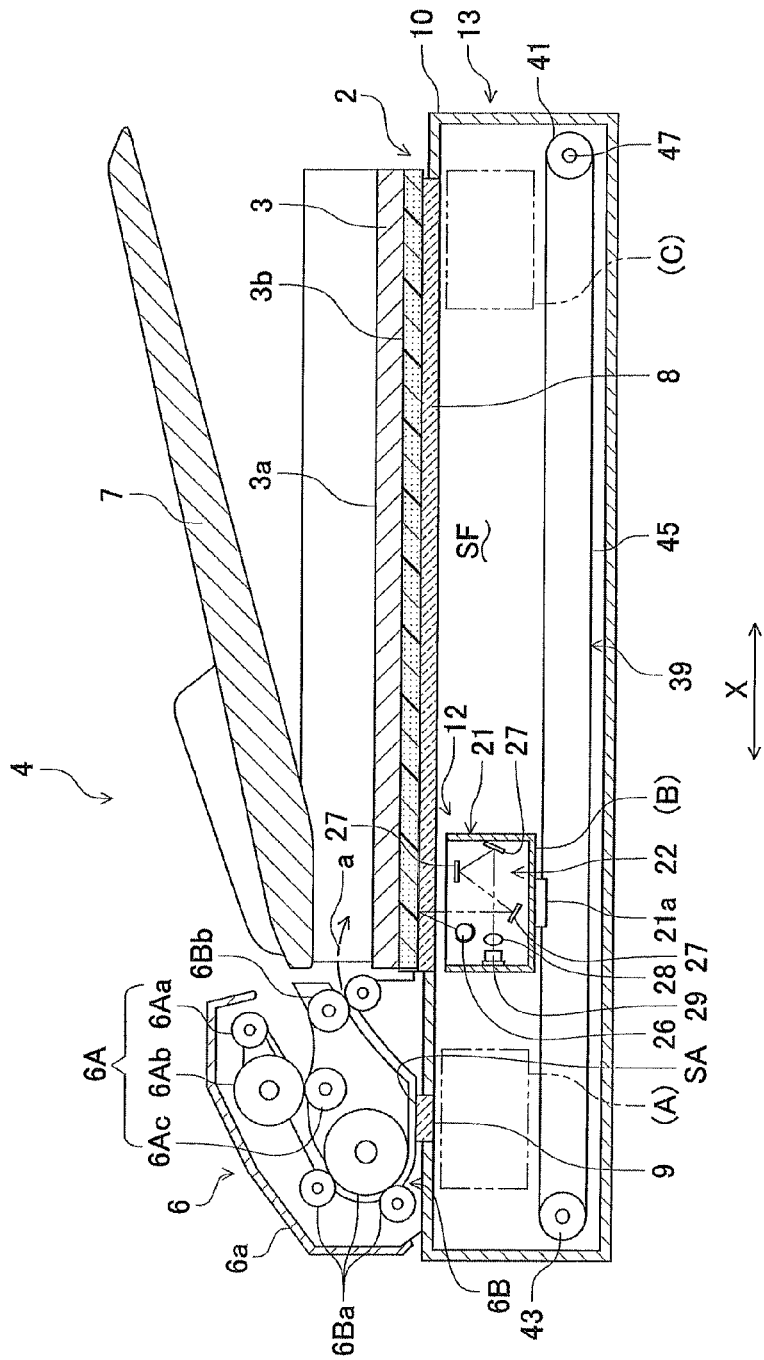
FIG. 2 is a cross-sectional view of the upper portion of the copy/facsimile multifunction peripheral.

The copy/facsimile multifunction peripheral 1 includes a scanning table 2 serving as a Flat Bed Scanner (FBS), and a document pressing cover 3 attached to the scanning table 2 in a freely opening/closing manner. The document pressing cover 3 includes a cover main body 3a, and a document pressing sheet 3b preferably made of, for example, sponge or other suitable material, attached to the lower surface of the cover main body 3a. As illustrated in FIG. 2, an auto document feeder (hereinafter referred to as "ADF") 4 is arranged in the document pressing cover 3. An operation panel 5 is attached to the front side portion in the Y-direction of the scanning table 2.

The ADF 4 includes an ADF mechanism 6 and a document tray 7. The ADF mechanism 6 preferably includes a document feeding/separating supply unit 6A and a document transportation path 6B in an ADF cover 6a. The document feeding/separating supply unit 6A includes a pickup roller 6Aa, a separating roller 6Ab, and a retard roller 6Ac that reversely rotates while elastically contacting the separate roller 6Ab. The document transportation path 6B is curved and extends to the document feeding/separating supply unit 6A, and is defined by a transportation roller 6Ba and a discharge roller 6Bb. The document separated and supplied from the feeding/separating supply unit 6A is transported along the document transportation path 6B, and has the image scanned with an ADF document image scanning unit SA, to be described later, arranged in the middle. The document is then discharged to the discharge tray provided on the upper surface of the cover main body 3a of the document pressing cover 3, as illustrated with an arrow a.

Although not illustrated, the copy/facsimile multifunction peripheral 1 also may preferably include well-known elements such as an image recording unit, an image transmitting unit, and a paper feed cassette.

(2) Scanning Table

As illustrated in FIG. 2, the scanning table 2 includes a housing 10 in which a platen glass 8 and a slit glass 9 are arranged at the top surface, and a CCD scanning unit 12 arranged in the housing 10. The document placed on the platen glass 8 is fixed by closing the document pressing cover 3, and the CCD scanning unit 12 scans the image.

(2-1) Housing

Figure 3:
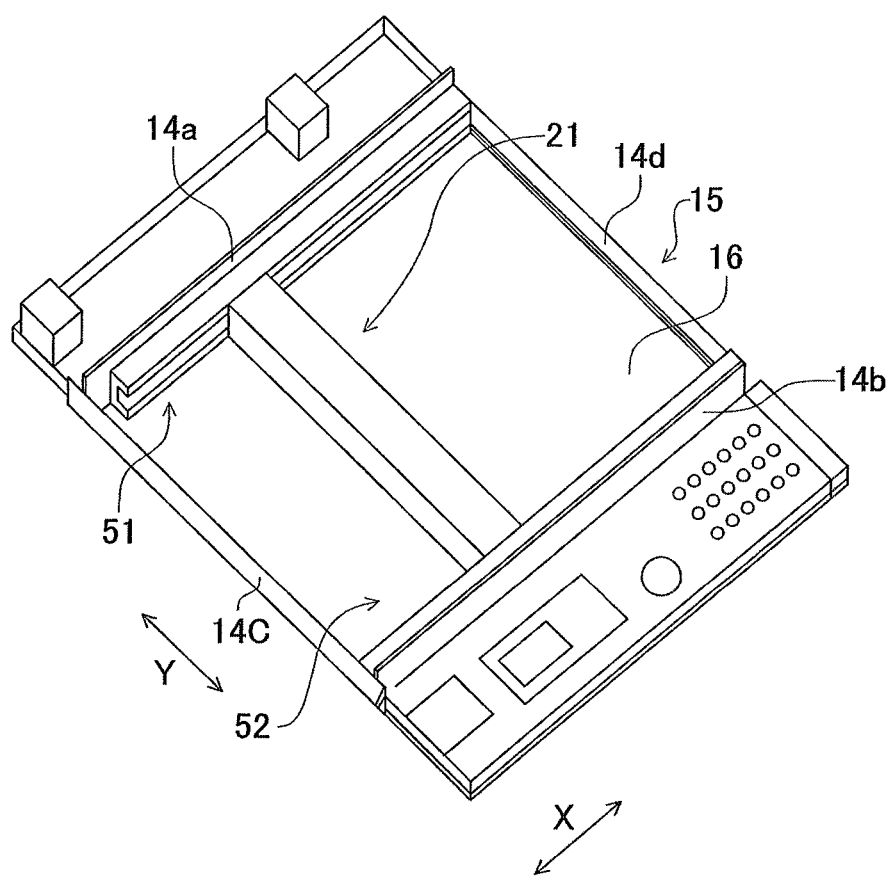
FIG. 3 is a perspective view of an outer appearance of a chassis and a CCD scanning unit.

As illustrated in FIG. 2, the housing 10 of the scanning table 2 includes a chassis 13 and a cover (not illustrated). The cover is attached to the upper portion of the chassis 13. The chassis 13 is preferably made of resin, and is configured by a frame 15 including four side wall members 14a, 14b, 14c, 14d and a bottom chassis 16 arranged on the lower side of the frame 15 to configure the bottom of the chassis 13, as illustrated in FIG. 3.

As hereinafter described, a first guide member 51 and a second guide member 52 arranged to support and guide the scanning carriage are arranged at the side wall members 14a, 14b arranged at the front and the back in the Y-direction.

(2-2) Scanning Unit

As illustrated in FIG. 2, the CCD scanning unit 12 includes a scanning carriage 21 scanned in parallel or substantially in parallel to the platen glass 8. The scanning carriage 21 includes a carriage main body 25. The carriage main body 25 includes a light source 26 including a fluorescent lamp or a cold cathode tube, a plurality of reflecting mirrors 27, a light-gathering lens 28, and a CCD image sensor 29. The position of the CCD scanning unit 12 can be moved between the ADF document image scanning unit SA and a FBS document image scanning unit SF. The light source 26 may be an LED.

The (A) position to (C) position of the CCD scanning unit 12 in FIG. 2 will be described below. The (A) position is the position where the CCD scanning unit 12 comes to rest at the ADF document image scanning unit SA. The (B) position is the position where the CCD scanning unit 12 comes to rest at the standby position of the FBS document image scanning unit SF. The (C) position is the position where the CCD scanning unit 12 travels through the FBS document image scanning unit SF and reaches the terminating end position of scanning.

The platen glass 8 is arranged at a site corresponding to the FBS document image scanning unit SF in the housing 10. The slit glass 9 is attached so as to face the document transportation path 6B and to stretch across the entire width in the width direction of the document transportation path 6B at the site corresponding to the ADF document image scanning unit SA in the housing 10.

The scanning carriage 21 is scanned by a belt drive mechanism 39. The belt drive mechanism 39 is configured such that a belt 45 bridged between a driving pulley 41 and a driven pulley 43 performs a circulating movement by the rotation of a drive shaft 47. The power is transmitted to the drive shaft 47 from a motor (not illustrated). The scanning carriage 21 is coupled to the belt 45 by way of a coupling unit 21a. The position of the scanning carriage 21 thus can be moved between the ADF document image scanning unit SA and the FBS document image scanning unit SF, and can reciprocate in the X-direction along the lower surface of the platen glass 8.

(3) Structure for Supporting Scanning Carriage

Figure 4:
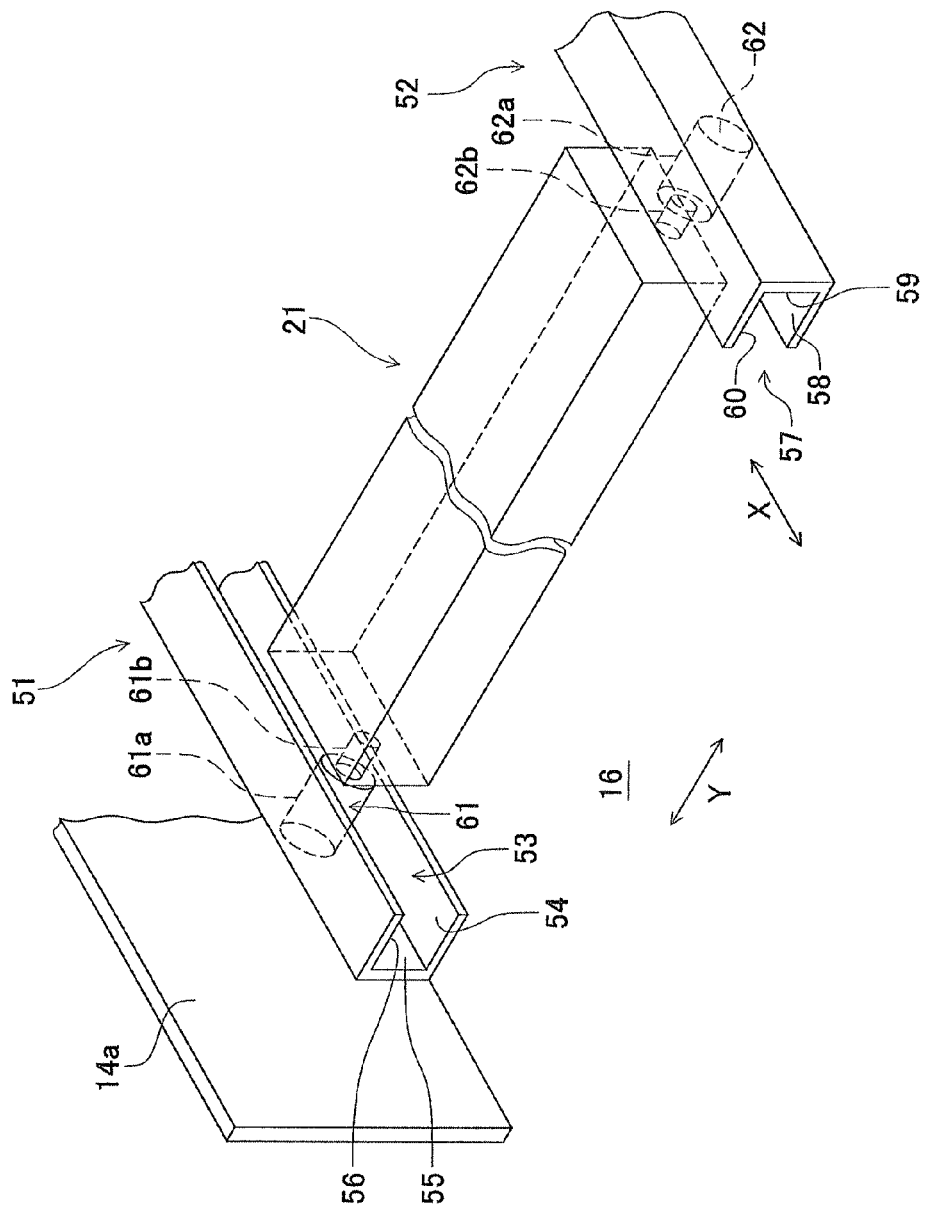
FIG. 4 is a perspective view of an outer appearance of a scanning carriage and a guide member.
Figure 5:
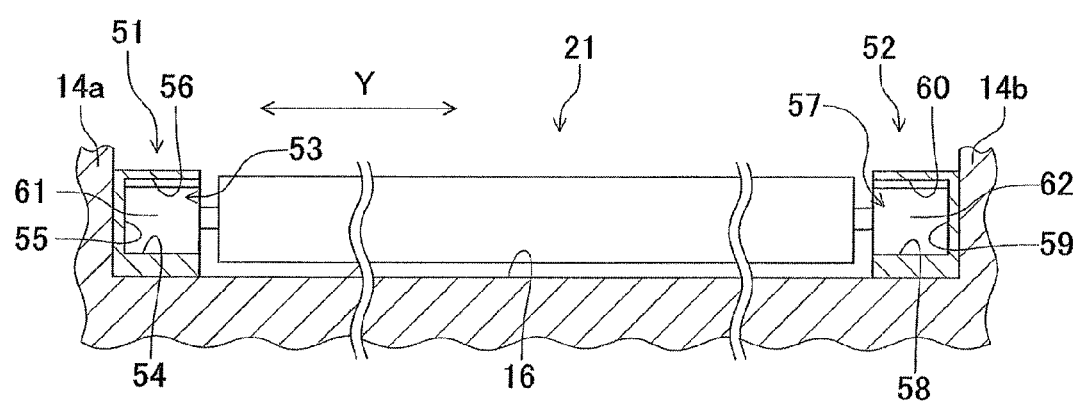
FIG. 5 is a cross-sectional view of the scanning carriage and the guide member.

The structure for supporting the scanning carriage will be described with reference to FIGS. 3 to 5. FIG. 3 is a perspective view of an outer appearance of the chassis and the CCD scanning unit. FIG. 4 is a perspective view of an outer appearance of the scanning carriage and the guide member. FIG. 5 is a cross-sectional view of the scanning carriage and the guide member.

The first guide member 51 and the second guide member 52 arranged to support and guide the scanning carriage 21 are attached to the side wall members 14a, 14b arranged at the front and the back in the Y-direction, respectively. The first guide member 51 and the second guide member 52 are preferably made of resin, or other suitable material.

The first guide member 51 is arranged near the side wall member 14a at the back side in the Y-direction, and is fixed to the bottom chassis 16. The method of fixing the first guide member 51 is not particularly limited. The first guide member 51 is a box-shaped member extending in a straight line in the X-direction. The first guide member 51 has a box-shaped cross-section with one surface opened, and specifically, includes a first guide groove 53. The first guide groove 53 extends in the X-direction along the first guide member 51. As is apparent from FIG. 5, the first guide groove 53 is opened toward the front side in the Y-direction, and includes a bottom surface 54, a side wall surface 55, and a top surface 56. In the cross-sectional view of FIG. 5, the bottom surface 54 and the top surface 56 are extended horizontally, and the side wall surface 55 is extended vertically.

The second guide member 52 is arranged near the side wall member 14b at the front side in the Y-direction, and is fixed to the bottom chassis 16. The method of fixing the second guide member 52 is not particularly limited. The second guide member 52 is a box-shaped member extending in a straight line in the X-direction. The second guide member 52 includes a second guide groove 57 and thus has a box-shaped cross-section with one surface opened. The second guide groove 57 extends in the X-direction along the second guide member 52. As is apparent from FIG. 5, the second guide groove 57 is opened toward the back side in the Y-direction, and includes a bottom surface 58, a side wall surface 59, and a top surface 60. In the cross-sectional view, the bottom surface 58 and the top surface 60 are extended horizontally, and the side wall surface 59 is extended vertically.

A first roller 61 and a second roller 62 are attached to both ends of the scanning carriage 21. The first roller 61 is rotatably arranged at the back side in the Y-direction of the scanning carriage 21. The rotation shaft of the first roller 61 extends in the Y-direction. More specifically, the first roller 61 includes a roller main body 61a, and a shaft 61b. The roller main body 61a is arranged in the first guide groove 53 of the first guide member 51. As illustrated in FIG. 5, the roller main body 61a is brought into contact with the bottom surface 54 of the first guide groove 53, and a gap in the up and down direction is ensured with the top surface 56. The end surface in the Y-direction of the roller main body 61a is proximate to the side wall surface 55 of the first guide groove 53 with a slight gap. The shaft 61b is fixed to the roller main body 61a, and is rotatably supported at the scanning carriage 21. The second roller 62 is rotatably arranged at the front side in the Y-direction of the scanning carriage 21. The rotation shaft of the second roller 62 extends in the Y-direction. More specifically, the second roller 62 includes a roller main body 62a, and a shaft 62b. The roller main body 62a is arranged in the second guide groove 57 of the second guide member 52. As illustrated in FIG. 5, the roller main body 62a is brought into contact with the bottom surface 58 of the second guide groove 57, and a gap in the up and down direction is ensured between the top surface 60. The end surface in the Y-direction of the roller main body 62a is proximate to the side wall surface 59 of the second guide groove 57 with a slight gap. The shaft 62b is fixed to the roller main body 62a, and is rotatably supported at the scanning carriage 21.

As illustrated in FIG. 4, the left side in the X-direction of the first guide member 51 and the second guide member 52 is opened, where the scanning carriage 21 is assembled to the first guide member 51 and the second guide member 52 from the relevant side. Specifically, the first roller 61 and the second roller 62 are inserted to the first guide groove 53 and the second guide groove 57, respectively, from the left side in the X-direction.

(4) Scanning Operation

A case of performing the scanning of the document image at the ADF document image scanning unit SA by the CCD scanning unit 12 will be described. First, when a user operates the operation panel 5, the scanning carriage 21 moves to the (A) position as illustrated in FIG. 2 and stops thereat according to such an operation, and at the same time, the document feeding/separating supply unit 6A is activated. The document placed on the document tray 7 is fed and separated one by one from the document at the uppermost layer, and then supplied toward the document transportation path 6B. The document then passes so as to contact the upper surface of the slit glass 9, and the irradiation light from the light source 26 of the CCD scanning unit 12 is irradiated in synchronization with the passing. The reflected light from the document repeats reflection by a plurality of reflecting mirrors 27 to be gathered by the light-gathering lens 28, and enters the CCD image sensor 29 (chain dashed line in FIG. 2 indicates optical path thereof). The CCD image sensor 29 converts the image information of the document surface to an electric signal and outputs the same.

A case of scanning the document image at the FBS document image scanning unit SF by the CCD scanning unit 12 will now be described. First, the user opens the document pressing cover 3, places the document on the platen glass 8 with the scanned image surface facing down, and operates the operation panel 5. The scanning carriage 21 moves to the (B) position as illustrated in FIG. 2 and once comes to rest thereat according to such an operation. Thereafter, the light source 26 is turned ON at the same time as when the scanning carriage 21 starts to travel and move toward the right side in the X-direction along the lower surface of the platen glass 8, and the document image is scanned similarly to the above by the CCD scanning unit 12 with the traveling. When the operation of scanning the document is terminated and the CCD scanning unit 12 reaches the (C) position, the light source 26 is turned OFF. Thereafter, the scanning carriage 21 travels reversely to return to the (B) position and waits to scan the next document. The reciprocal traveling of the scanning carriage 21 is performed by the belt drive mechanism 39. The belt drive mechanism 39 circulates and moves the belt 45 between the driving pulley 41 and the driven pulley 43 by having the motor (not illustrated) rotate the drive shaft 47 and the drive shaft 47 drive the driving pulley 41.

In the above scanning operation, the scanning carriage 21 is guided in the X-direction by the first guide groove 53 and the second guide groove 57 when moving through the housing 10. The carriage 21 is thus supported by a simple structure while maintaining a sufficient accuracy. More specifically, the scanning carriage 21 is arranged to have the first roller 61 guided by the first guide groove 53 of the first guide member 51 and the second roller 62 guided by the second guide groove 57 of the second guide member 52. As a result, the traveling of the scanning carriage 21 becomes smooth and stable.

Therefore, the traveling accuracy of the scanning carriage 21 is enhanced. That is, when vibration occurs in the scanning carriage, the scanning performance may be lowered as the optical axes between the mirrors shift, and ultimately the document scanned image may be degraded, but such a problem is less likely to occur in the above-described preferred embodiment.

(5) Second Preferred Embodiment

The scanning carriage preferably has a height that changes in accordance with the side wall guide groove, so that the scanning carriage can move to a higher position or a lower position than the normal height, as needed.

Figure 6:
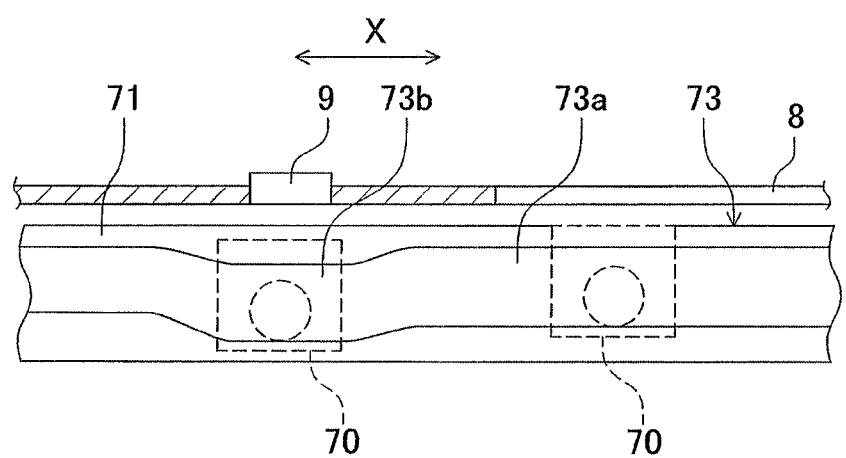
FIG. 6 is a partial front view of a guide member according to a second preferred embodiment of the present invention.

A second preferred embodiment will be described with reference to FIG. 6. FIG. 6 is a partial front view of a guide member according to the second preferred embodiment. In the second preferred embodiment, the basic structure of the copy/facsimile multifunction peripheral and the CCD scanning device is preferably the same as the first preferred embodiment.

FIG. 6 illustrates a structure arranged to support a scanning carriage 70. Rollers are attached to both ends of the scanning carriage 70 similarly to the first preferred embodiment, and the rollers are arranged in the guide grooves. The points and features that are different from the first preferred embodiment will be described below.

A first guide groove 73 of a first guide member 71 includes a plurality of portions having different heights. Specifically, the first guide groove 73 includes a first portion 73a extending in the horizontal direction and a second portion 73b at a position lower than the first portion 73a. The first portion 73a and the second portion 73b are smoothly connected.

The second portion 73b is arranged at a position corresponding to the slit glass 9. That is, since the second portion 73b of the first guide groove 73 corresponds to the slit glass 9 and is lower than the first portion 73a, the scanning carriage 70 moves to the lower side than the first portion 73a at the position corresponding to the slit glass 9. Therefore, the scanning carriage 70 can avoid the step difference between the platen glass 8 and the slit glass 9.

Therefore, while the scanning carriage 70 is arranged on the upper side as much as possible to miniaturize the device in the up and down direction, collision is avoided by being moved to the lower side as necessary. Since a special structure for moving the scanning carriage up and down is not necessary, the entire structure is simple.

In particular, when using the Contact Image Scanner (CIS) type scanning carriage, the scanning carriage might come into contact with the step difference between the platen glass and the slit glass when being moved to the (A) position since scanning is required to be performed at a position where the scanning carriage is close to the platen glass as much as possible. However, the contact of the scanning carriage and the step difference can be prevented by moving the scanning carriage to the lower side.

The guide groove may include the usual first portion extending in the horizontal direction and a third portion at a position higher than the first portion. The third portion is effective in avoiding the interference of the member at the lower side of the scanning carriage and the scanning carriage. The guide groove may include the usual first portion extending in the horizontal direction, a second portion at a position lower than the first portion, and a third portion at a position higher than the first portion. The number of the second portion and third portion may be a plurality or may include a height having a plurality of different levels.

The member that the scanning carriage is to avoid may be another member such as a screw arranged to fix the cover.

(6) Third Preferred Embodiment

Figure 7:
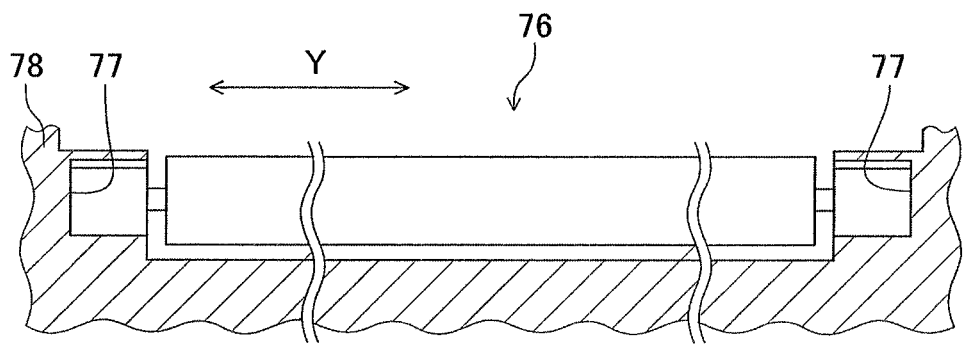
FIG. 7 is a cross-sectional view of a scanning carriage and a guide member according to a third preferred embodiment of the present invention.

A third preferred embodiment will be described with reference to FIG. 7. FIG. 7 is a cross-sectional view of a scanning carriage and a guide member according to the third preferred embodiment. In the third preferred embodiment, the basic structure of the copy/facsimile multifunction peripheral and the CCD scanning device is preferably the same as that of the first preferred embodiment.

FIG. 7 illustrates a structure arranged to support a scanning carriage 76. Rollers are attached to both ends of the scanning carriage 76 similarly to the first preferred embodiment, and the rollers are arranged in the guide grooves. The points and features that are different from the first preferred embodiment will be described below.

In this preferred embodiment, a first guide groove 77 preferably is integrally molded with a chassis 78. Therefore, the number of components is reduced and the configuration is simplified.

(7) Fourth Preferred Embodiment

Figure 8:
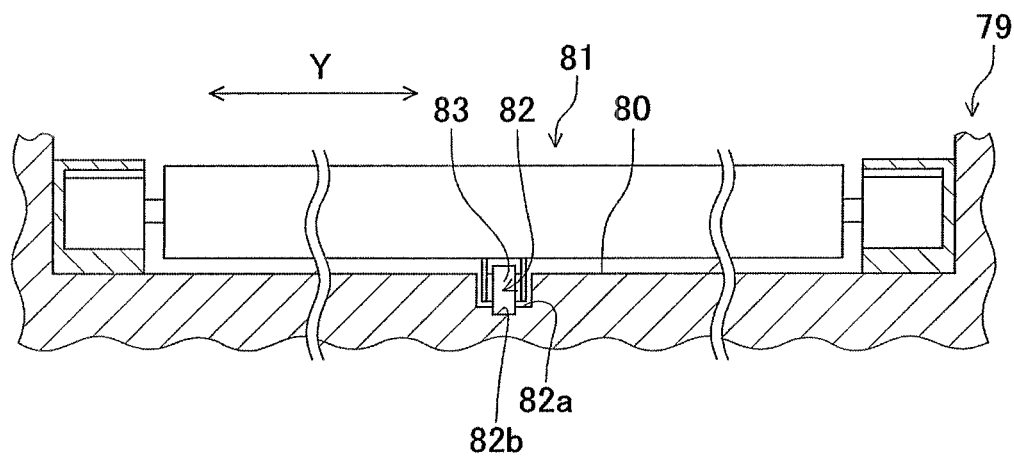
FIG. 8 is a cross-sectional view of a scanning carriage and a guide member according to a fourth preferred embodiment of the present invention.

A fourth preferred embodiment will be described with reference to FIG. 8. FIG. 8 is a cross-sectional view of a scanning carriage and a guide member according to the fourth preferred embodiment. In the fourth preferred embodiment, the basic structure of the copy/facsimile multifunction peripheral and the CCD scanning device is the same as that of the first preferred embodiment.

FIG. 8 illustrates a structure arranged to support a scanning carriage 81. Rollers are attached to both ends of the scanning carriage 81 similarly to the first preferred embodiment, and the rollers are arranged in the guide grooves. The points and features that are different from the first preferred embodiment will be described below.

A bottom surface guide groove 82 arranged to guide the scanning carriage 81 in the X-direction is provided at a bottom surface 80 of a chassis 79. A roller 83 is arranged at a lower surface of the scanning carriage 81. The bottom surface guide groove 82 accommodates a roller 83, and includes a first bottom surface 82a and a second bottom surface 82b. The first bottom surface 82a is provided on both sides in the Y-direction of the bottom surface of the bottom surface guide groove 82, and is extended in the X-direction. The second bottom surface 82b is provided at the middle in the Y-direction of the bottom surface of the bottom surface guide groove 82, and is extended in the X-direction. The roller 83 is arranged on the second bottom surface 82b of the bottom surface guide groove 82.

In this device, the supporting accuracy is further enhanced since the scanning carriage 81 is also guided by the bottom surface guide groove 82, and as a result, the scanning carriage 81 can stably travel.

(8) Fifth Preferred Embodiment

Figure 9:
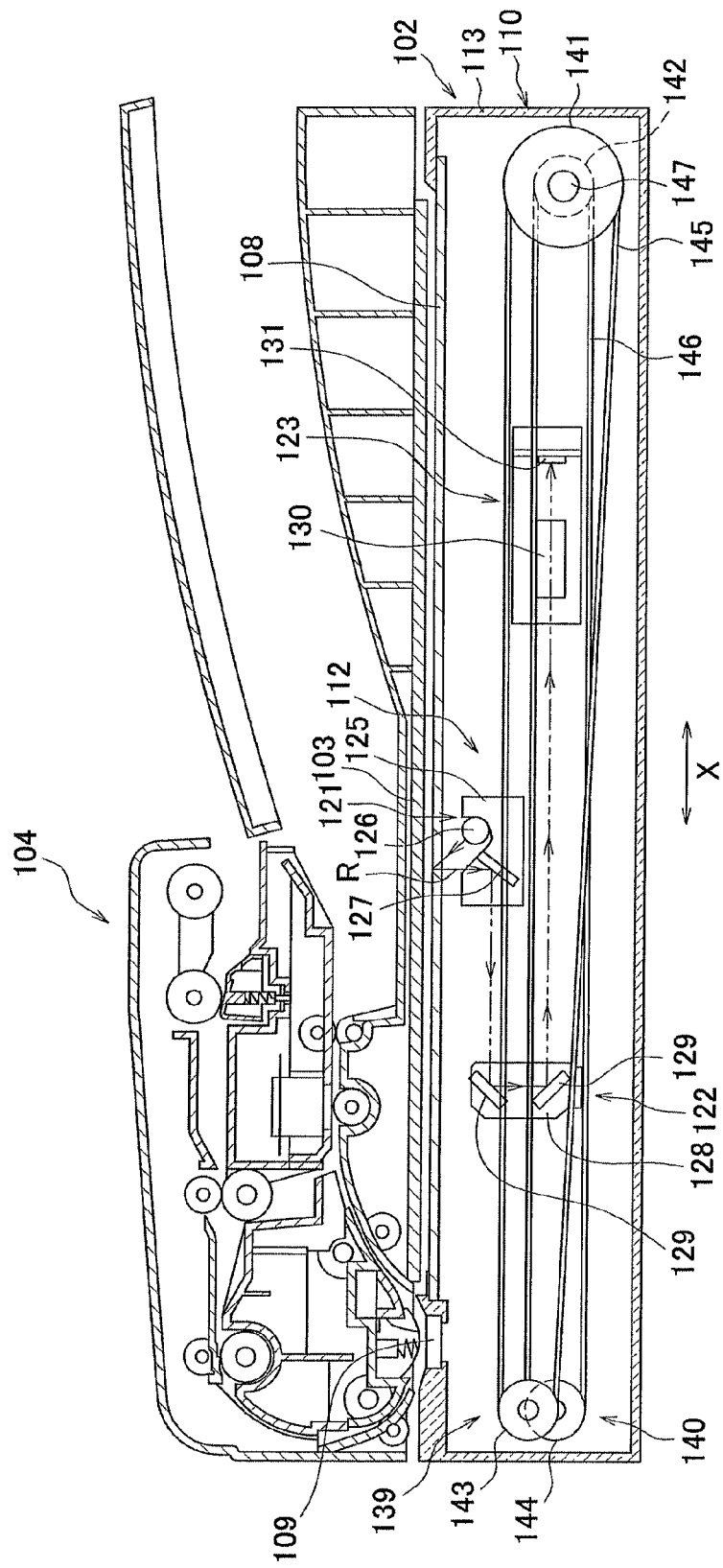
FIG. 9 is a cross-sectional view of the upper portion of a copy/facsimile multifunction peripheral according to a fifth preferred embodiment of the present invention.
Figure 10:
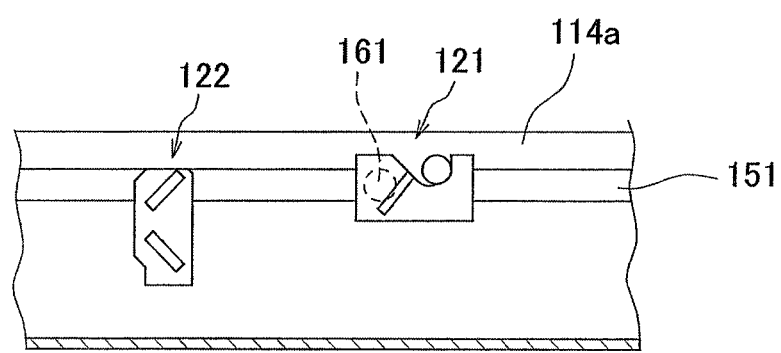
FIG. 10 is a partial front view of a scanning carriage and a guide member according to the fifth preferred embodiment of the present invention.

A fifth preferred embodiment will be described with reference to FIGS. 9 and 10. FIG. 9 is a cross-sectional view of the upper portion of a copy/facsimile multifunction peripheral according to a fifth preferred embodiment. FIG. 10 is a partial front view of a scanning carriage and a guide member according to the fifth preferred embodiment. In the fifth preferred embodiment, the basic structure of the copy/facsimile multifunction peripheral is preferably the same as that of the first preferred embodiment.

The copy/facsimile multifunction peripheral includes a scanning table 102 serving as an FBS, and a document pressing cover 103 attached to the scanning table 102 in a freely opening/closing manner. The document pressing cover 103 is provided with an ADF 104.

As illustrated in FIG. 9, the scanning table 102 includes a housing 110 in which a platen glass 108 and a slit glass 109 are arranged at the top surface, and a CCD scanning unit 112 arranged in the housing 110.

The CCD scanning unit 112 will be described with reference to FIG. 9. The CCD scanning unit 112 is a device arranged to irradiate the document with light and to guide the reflected light from the document to a predetermined position where an image sensor is arranged, and to convert the reflected light to an electric signal. As illustrated in FIG. 9, the CCD scanning unit 112 includes a full rate carriage 121 and a half rate carriage 122 that are scanned parallel to the platen glass 108, and a scanner unit 123. The full rate carriage 121 includes a carriage main body 125, a light source 126, and a reflecting mirror 127. The light source 126 is mounted on the carriage main body 125 and irradiates the document with light. The reflecting mirror 127 is mounted on the carriage main body 125, and reflects the reflected light R from the document in the X-direction and guides the same to the half rate carriage 122. The half rate carriage 122 includes a carriage main body 128 and two reflecting mirrors 129. The reflecting mirror 129 is arranged in the carriage main body 128, and guides the reflected light R from the full rate carriage 121 to the scanner unit 123. The scanner unit 123 includes an imaging lens 130 arranged to focus the reflected light R from the half rate carriage 122, and a CCD image sensor 131 arranged to convert the focused light to an electric signal. The CCD image sensor 131 is adjusted to be positioned on an optical axis of the imaging lens 130.

The full rate carriage 121 and the half rate carriage 122 are scanned by a first belt drive mechanism 139 and a second belt drive mechanism 140. The first belt drive mechanism 139 is configured such that a first belt 145 bridged between a first driving pulley 141 and a first driven pulley 143 performs a circulating movement by the rotation of a drive shaft 147. The second belt drive mechanism 140 is configured such that a second belt 146 bridged between a second driving pulley 142 and a second driven pulley 144 performs a circulating movement by the rotation of the drive shaft 147. The power is transmitted to the drive shaft 147 from a motor (not illustrated).

The full rate carriage 121 is fixed to the first belt 145 and the half rate carriage 122 is fixed to the second belt 146. The first driving pulley 141 and the second driving pulley 142 are both fixed to the drive shaft 147. The range in which the full rate carriage 121 and the half rate carriage 122 perform scanning is set according to the gear ratio of the first driving pulley 141 and the second driving pulley 142. Specifically, the gear ratio of the second driving pulley 142 with respect to the first driving pulley 141 is about ½, for example. Thus, the half rate carriage 122 is scanned at a speed of about ½ of the scanning speed of the full rate carriage 121, and the scanning distance of the half rate carriage 122 is about half the scanning distance of the full rate carriage 121.

As illustrated in FIG. 10, a side wall member 114a preferably includes a guide groove 151 arranged to support and guide the full rate carriage 121. The guide groove 151 may be fixed as a separate member as in the first preferred embodiment, or may be integrally molded as in the third preferred embodiment with respect to the side wall member 114a, for example.

A roller 161 is attached to both ends of the full rate carriage 121. The structure and the function of the roller 161 are similar to the first roller 61 and the second roller 62 of the first preferred embodiment. The roller 161 is arranged in the guide groove 151. The relationship of the roller and the guide groove is similar to that of the first preferred embodiment.

When scanning the image of the document, the full rate carriage 121 is moved in parallel or substantially in parallel with respect to the document on the platen glass 108 while emitting light from the light source 126. As a result, the scanning surface of the document is sequentially irradiated in the X-direction with the light of the light source 126, and the reflected light R of such light is reflected by the reflecting mirror 127 toward the half rate carriage 122. The half rate carriage 122 is also moved at the same time as the full rate carriage 121, and reflects the reflected light R from the full rate carriage 121 with two reflecting mirrors 129 and guides to the scanner unit 123. The reflected light R is scanned with the CCD image sensor 131 and outputted as an electric signal by the scanner unit 123, and the image of the document is recorded on recording paper by the recording unit based on the electric signal or is transmitted by the transmitting unit.

In the above scanning operation, the full rate carriage 121 is guided in the X-direction by the guide groove 151 when moving through the housing 110. The full rate carriage 121 and the half rate carriage 122 are thus supported with a simple structure while maintaining sufficient accuracy. More specifically, the full rate carriage 121 is arranged to have the roller 161 guided by the guide groove 151. As a result, the traveling of the full rate carriage 121 and the half rate carriage 122 becomes smooth and stable.

The guiding guide groove dedicated to the full rate carriage is preferably provided in the present preferred embodiment, but the guiding guide groove for the half rate carriage may be provided. The grooves for both carriages may be independent, or one portion or the entire portion thereof may be in common.

The aspects of the second to fourth preferred embodiments may be applied to the fifth preferred embodiment alone or by being appropriately combined as necessary or desired.

(9) Sixth Preferred Embodiment

Figure 11:
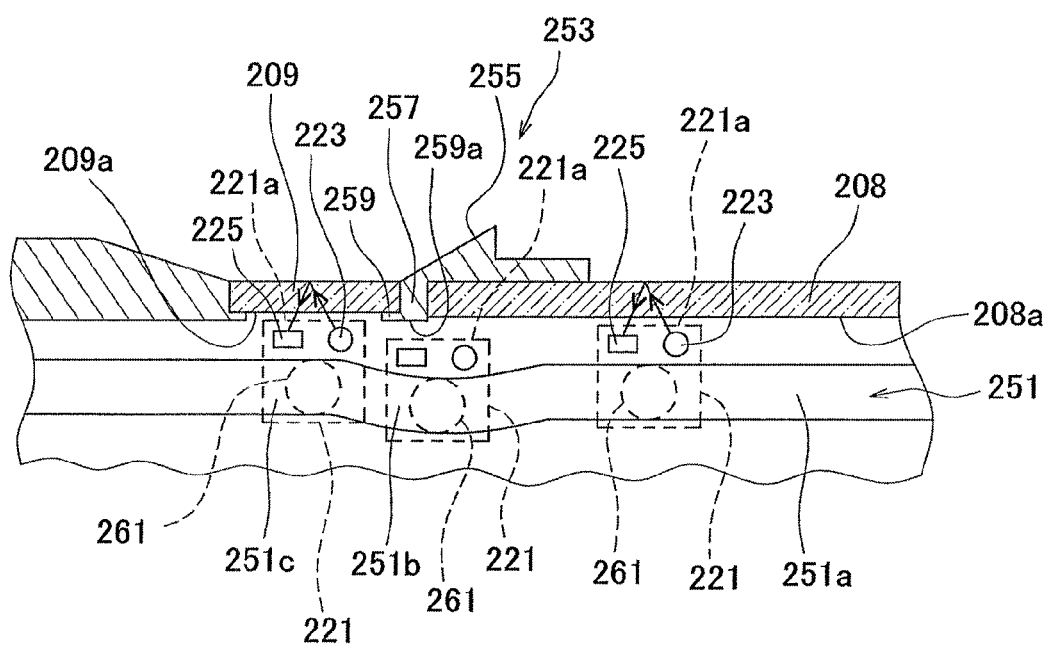
FIG. 11 is a partial front view of a scanning carriage and a guide member according to a sixth preferred embodiment of the present invention.

A sixth preferred embodiment will be described with reference to FIG. 11. FIG. 11 is a partial cross-sectional view of a scanning carriage and a guide member according to the sixth preferred embodiment. In the sixth preferred embodiment, the basic structure of the copy/facsimile multifunction peripheral preferably is the same as that of the first preferred embodiment.

In the sixth preferred embodiment, a CIS scanning unit is preferably used. A CIS scanning unit 221 (scanning carriage) interiorly includes a light source 223 and a sensor 225. The light emitted from the light source 223 thus passes through the platen glass 208 or the slit glass 209 and then returns to the sensor 225 by being reflected by paper on each glass. The document image is thereby scanned.

As illustrated in FIG. 11, a supporting member 253 is arranged between the platen glass 208 and the slit glass 209. The supporting member 253 is fixed to a housing (not illustrated), and supports the slit glass 209. The supporting member 253 includes an inclined surface 255 extending toward an upper right area in the figure from the upper surface of the slit glass 209. The inclined surface 255 is a guide structure arranged to pickup the paper passing through the slit glass 209 and transporting the paper.

The supporting member 253 also includes a first portion 257 extending between the slit glass 209 and the platen glass 208, and a second portion 259 extending to the side from the lower end of the first portion 257 and supporting the slit glass 209 from the lower side. The second portion 259 is thus positioned further on the lower side than the lower surface 209a of the slit glass 209 and the lower surface 208a of the platen glass 208. The height position of the lower surface 209a of the slit glass 209 and the lower surface 208a of the platen glass 208 is the same.

The CIS scanning unit 221 preferably has a height portion changed in accordance with a side wall guide groove 251, and hence the CIS scanning unit 221 can move to a higher position or can move to a lower position than the normal height, as necessary.

A roller 261 is attached to both ends of the CIS scanning unit 221, similarly to the first preferred embodiment, and the roller 261 is arranged in the side wall guide groove 251.

The side wall guide groove 251 extends in the horizontal direction, and includes a plurality of portions having different heights. Specifically, the side wall guide groove 251 includes a first portion 251a, a second portion 251b at a position lower than the first portion 251a, and a third portion 251c at the same height position as the first portion 251a, from the right side of the figure toward the left side of the figure. The first portion 251a and the second portion 251b are smoothly connected, and the second portion 251b and the third portion 251c are smoothly connected.

The first portion 251a and the third portion 251c are arranged at positions corresponding to the platen glass 208 and the slit glass 209, respectively. Therefore, the CIS scanning unit 221 can perform the image scanning operation while being proximate to the platen glass 208 or the slit glass 209. An upper surface 221a of the CIS scanning unit 221 in this case is at a height position slightly lower than or on the upper side of a lower surface 259a of the second portion 259 of the supporting member 253.

In the side wall guide groove 251, the heights of the first portion 251a and the second portion 251b are the same. Therefore, the height position of the upper surface 221a of the CIS scanning unit 221 is the same for both of the cases when the CIS scanning unit 221 is positioned at the first portion 251a and when positioned at the second portion 251b.

The second portion 251b is arranged at a position corresponding to the second portion 259 of the supporting member 253. That is, since the second portion 251b of the side wall guide groove 251 corresponds to the supporting member 253 and is at a position lower than the first portion 251a and the third portion 251c, the CIS scanning unit 221 moves to the lower side than the first portion 251a and the third portion 251c at a position corresponding to the supporting member 253. Therefore, a gap is ensured between the upper surface 221a of the CIS scanning unit 221 and the lower surface 259a of the second portion 259 of the supporting member 253. As a result of the above, the CIS scanning unit 221 can avoid the step difference (portion projecting downward) between the slit glass 209 and the platen glass 208.

In this device, the CIS scanning unit 221 can take in the document image while being proximate to the platen glass 208 when the CIS scanning unit 221 travels through the first portion 251a of the side wall guide groove 251. Furthermore, when the CIS scanning unit 221 is positioned at the third portion 251c of the side wall guide groove 251, the CIS scanning unit 221 can take in the document image while being proximate to the slit glass 209. Moreover, the CIS scanning unit 221 moves to the lower side than the image scanning position when the CIS scanning unit 221 passes the second portion 251b of the side wall guide groove 251. Therefore, the CIS scanning unit 221 is less likely to collide against the supporting member 253 even if the image scanning position of the CIS scanning unit 221 is sufficiently high.

Therefore, while the CIS scanning unit 221 is arranged on the upper side as much as possible and the device is miniaturized in the up and down direction, the collision with the supporting member 253 can be avoided by the CIS scanning unit 221 moving to the lower side as necessary. In the case of the CIS, in particular, it is preferably arranged sufficiently close to the glass since the focal length is shallow. In such a case, however, there arises a problem in that the movement of the CIS scanning unit becomes difficult due to the step difference by the supporting member between the platen glass and the slit glass. In the present preferred embodiment, such problems of the case where the CIS scanning unit is used are solved.

The entire structure is simple since a special structure for moving the CIS scanning unit up and down is not necessary.

The member that the CIS scanning unit is to avoid may be other members such as a screw arranged to fix the supporting member.

(10) Other Preferred Embodiments

Preferred embodiments of the present invention have been described above, but the present invention is not limited to the above-described preferred embodiments, and various modifications and combinations thereof may be made without departing from the scope of the invention. In particular, a plurality of preferred embodiments and variants described in the specification may be arbitrarily combined as necessary or desired.

In the above-described preferred embodiments, a roller preferably is arranged at both ends of the scanning carriage, but the present invention is not limited to such preferred embodiments. For instance, one end of the scanning carriage merely needs to be able to slide on the bottom surface of the side wall guide groove. For instance, a projection with an arcuate cross-sectional shape and extending in the Y-direction may be arranged at the end of the scanning carriage or the bottom surface of the side wall guide groove.

In the above-described preferred embodiments, a guided structure at both ends of the scanning carriage is preferably the same, but the present invention is not limited to such preferred embodiments. That is, a guided structure at both ends of the scanning carriage may differ from each other. For instance, a roller similar to the above-described preferred embodiments may be arranged at one end of the scanning carriage, and a different structure may be arranged at the other end.

Preferred embodiments of the present invention can be widely applied to the image scanning device including the scanning carriage.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An image scanning device, comprising:
a housing including a bottom surface and a side wall, and defining a document table;
a scanning carriage movably arranged in the housing;
a side wall guide groove arranged at the side wall of the housing to guide the scanning carriage in a scanning direction;
an automatic document transportation device; and
a slit glass arranged in the housing to enable a document sent from the automatic document transportation device to be scanned by the scanning carriage; wherein
the side wall guide groove includes a plurality of portions having different heights; and the side wall guide groove includes a first portion and a second portion corresponding to the slit glass and being lower than the first portion.

2. An image scanning device, comprising:
a housing including a bottom surface and a side wall, and defining a document table;
a scanning carriage movably arranged in the housing;
a side wall guide groove arranged at the side wall of the housing to guide the scanning carriage in a scanning direction;
a platen glass;
an automatic document transportation device arranged above the platen glass;
a slit glass arranged lined with the platen glass to enable a document sent from the automatic document transportation device to be scanned by the scanning carriage; and
a supporting member arranged between the slit glass and the platen glass; wherein
the side wall guide groove includes a plurality of portions having different heights; and
the side wall guide groove includes a first portion corresponding to the slit glass, a second portion corresponding to the supporting member and being lower than the first portion, and a third portion corresponding to the platen glass and being higher than the second portion.

3. The image scanning device according to claim 1, wherein the side wall guide groove is integrally molded with the housing.

4. The image scanning device according to claim 1, further comprising a bottom surface guide groove arranged at the bottom surface of the housing to guide the scanning carriage in the scanning direction.

5. The image scanning device according to claim 2, wherein the side wall guide groove is integrally molded with the housing.

6. The image scanning device according to claim 2, further comprising a bottom surface guide groove arranged at the bottom surface of the housing to guide the scanning carriage in the scanning direction.

* * * * *